United States Patent Office 3,532,688
Patented Oct. 6, 1970

---

3,532,688
α-(β-ARYLPROPIONAMIDO)-ARALKYL-PENICILLINS
Brian William Hatt and Peter Martin Newsome, Surrey, and Harry Smith, Sussex, England, assignors to Beecham Group Limited, Brentford, England, a British company
No Drawing. Filed Oct. 3, 1967, Ser. No. 672,435
Claims priority, application Great Britain, Oct. 4, 1966, 44,264/66
Int. Cl. C07d 99/16
U.S. Cl. 260—239.1                5 Claims

ABSTRACT OF THE DISCLOSURE

New penicillins are provided of the general formula $R^1CH(Y)CH(X)CONHCH(R)CONH.pen$ wherein pen is the penicillin nucleus, R and $R^1$ are phenyl or thienyl and X is H, or —NHCOOR$^2$ and Y is H, NH$_2$,

—NHCOOR$^2$ or —NHCOR$^3$. These penicillins are active against gram positive and gram negative bacteria including Pseudomonas spp. They are made by acylating an α-aminopenicillin $H_2N$—CH(R)CONH.pen with a propionic acid derivative, provided that if X or Y is to be an amino group it is "protected" during the acylation step.

---

This invention relates to new penicillins which are active against both gram-positive and gram-negative bacteria: this makes them useful as therapeutic and prophylactic agents against bacterial infections in animals, including man and poultry.

The new penicillins provided by this invention are of the general Formula I and non-toxic salts thereof:

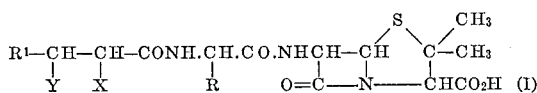

(I)

wherein R and $R^1$ are the same or different and each is a phenyl or thienyl group, X is a hydrogen atom, or a group —NHCOOR$^2$ where $R^2$ is an alkyl, aryl or aralkyl group, and Y is a hydrogen atom, an amino group, a group —NHCOOR$^2$ where $R^2$ is as defined above or an acylamino group —NHCOR$^3$ wherein $R^3$ is a hydrogen atom, an alkyl, aryl or aralkyl group.

Preferred compounds are those in which one of the groups X and Y is a hydrogen atom, the other being an amino group if appropriate or a protected amino group, —NHCOOR$^2$ as defined above.

Particularly preferred compounds are 6-[D-α-(L-β-amino-β-phenylpropionamido) - α-phenylacetamido]penicillanic acid, 6 - [D-α-(D-α-benzyloxycarbonylamino-β-phenylpropionamido) - α - phenylacetamido]penicillanic acid and 6-[D-α-(D-α-ethoxycarbonylamino-β-phenylpropionamido)-α-phenylacetamido]penicillanic acid.

The nontoxic salts include metallic salts such as sodium, potassium, calcium and aluminum, ammonium and substituted ammonium salts, e.g. salts of such nontoxic amines as trialkylamines, (including triethylamine), procaine, dibenzylamine, N-benzyl-β-phenethylamine, 1-ephenamine, N,N' - dibenzylethylenediamine, dehydroabietylamine, N,N' - bis-dehydroabietylethylenediamine, and other amines which have been used to form salts with benzylpenicillin.

When the penicillin of Formula I contains a basic amino group this may also be present in the form of an acid addition salt.

All of the penicillins of Formula I contain at least one asymmetric carbon atom in the side chain (i.e. the α-carbon atom to which R is attached) and when either X or Y or both X and Y are groups other than hydrogen atoms a second or second and third asymmetric centre is also present so that a single compound as represented by Formula I may exist in several different spatial configurations. However, since all of the compounds of one formula are merely epimers or stereoisomers of each other it is to be understood that they are all intended to be covered by the definition of Formula I. In practice, penicillins in which the α-carbon atom of the side chain has the D-configuration are generally more active than are those in which it has the L-configuration. The configuration at centres more remote from the penicillin nucleus (carbon atom to which X is attached and carbon atom to which Y is attached) appear to have less influence on antibacterial activity. This is borne out by reference to the accompanying Table I.

$$Ph\underset{Y}{\overset{(c)}{-}}\underset{}{\overset{}{C}H}\underset{X}{\overset{(b)}{-}}\underset{}{\overset{}{C}H}-CO.NH.\underset{R}{\overset{(a)}{C}H}CO-NH-CH-CH\diagup\overset{S}{\underset{CO-N}{\diagdown}}\diagdown\overset{CH_3}{\underset{CH.CO_2H}{\diagup}}C\diagdown CH_3$$

| Example No. | Applicants' compound reference | R | X | Y | Configuration (a) | (b) | (c) | M.I.C. (ug./ml.) E. coli | Ps.pyo.A |
|---|---|---|---|---|---|---|---|---|---|
| 8 | 3377 | Ph | NHCO$_2$CH$_2$Ph | H | D | L | | 50 | 50 |
| 6 | 3313 | Ph | NHCO$_2$CH$_2$Ph | H | D | L | | 50 | 250 |
| 7 | 3315 | Ph | NHCO$_2$CH$_2$Ph | H | L | L | | >500 | >250 |
| 3 | 3089 | Ph | H | NHCO$_2$CH$_2$Ph | D | | D | 125 | 125 |
| 1 | 3086 | Ph | H | NHCO$_2$CH$_2$Ph | D | | L | 125 | 125 |
| 4 | 3090 | Ph | H | NH$_2$ | D | | D | 50 | 125 |
| 2 | 3088 | Ph | H | NH$_2$ | D | | L | 12.5 | 55 |
| 5 | 3289 | Ph | H | NHCHO | D | | D | 125 | 250 |
| 9 | 3138 | Ph | H | H | D | | | 50 | 500 |
| 10 | 3476 | Ph | NHCO$_2$C$_2$H$_5$ | H | D | D | | 50 | 50 |
| 13 | 3848 | th | H | NH$_2$ | (*) | | L | 50 | 120 |
| 14 | 3760 | th | H | NH$_2$ | (*) | | D | 50 | 125 |

In the above table the abbreviation Ph stands for a phenyl group, th for a 2-thienyl group and M.I.C. stands for Minimum Inhibitory Concentration, E.coli for Escherichia coli and Ps.pyo.A for a strain of Pseudomonas pyocvanea: E.coli and Pseudomonas are both gram-negative bacteria against which most conventional penicillins are relatively ineffective. The asterisk against the α-carbon atom for the thienyl compounds of Examples 16 and 17 indicates that these compounds were prepared from α-amino-2-thenylpenicillin which had itself been prepared from laevo rotatory α-amino-2-thienylacetic acid as mentioned in Example 12.

The new penicillins of Formula I, except those wherein X or Y is an NH$_2$ group, are prepared by the reaction of an α-amino-penicillin of Formula II.

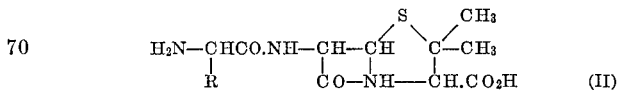

(II)

with a propionic acid derivative acylating agent of Formula III

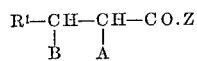 (III)

wherein R and R¹ are as defined above, A and B represent X and Y respectively provided that X and Y are other than NH₂ groups, and Z is a functional group of the type used for acylating primary amines: thus for example Z may be a chlorine or bromine atom (i.e. III is an acyl halide) or an azido group, or an acyloxy or alkoxycarbonyloxy group (i.e. III is an acid anhydride or mixed anhydride) or a 1-imidazolyl or N,N¹-disubstituted-isoureido group (i.e. III is an intermediate formed from the appropriate propionic acid derivative and a condensing agent such as carbonyldiimidazole or a N,N¹-disubstituted-carbodiimide such as dicyclohexylcarbodiimide). Some of these acylating agents of Formula III are unstable substances which are preferably freshly prepared in a suitable solvent below room temperature and are used in situ.

It will be appreciated that when X or Y is to be an —NH₂ group it is necessary firstly to prepare an intermediate penicillin wherein this amino group is "protected," or in other words in place of X or Y there is a nitrogen containing group which can be converted to a free amino group.

The conversion of the protected group to the group Y must be carried out under conditions which cannot affect the rest of the molecule and in particular will not disrupt the sensitive β-lactam ring of the penicillin nucleus. The conversion may be affected for example by mild hydrogenation or mild hydrolysis.

Examples of groups which can be converted to —NH₂ groups by catalytic hydrogenation include the azido group, the benzyloxy-carbonylamino group and substituted benzyloxycarbonylamino groups.

Examples of the groups which may be converted into —NH₂ groups by a process of mild hydrolysis include enamine groups of general Formula VI or tautomeric modifications thereof, and o-hydroxyarylideneamino groups of the general Formula VII, or tautomeric modifications thereof.

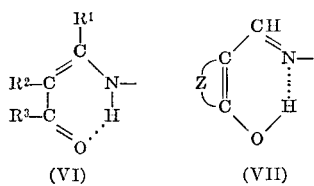

(VI)          (VII)

In structures (VI) and (VII) the dotted lines represent hydrogen bonds. In structure (VI) R¹ is a lower alkyl group, R² is either a hydrogen atom or together with R¹ completes a carbocyclic ring, and R³ is a lower alkyl, aryl, or lower alkoxy group. In structure (VII) Z represents the residue of a substituted or unsubstituted benzene or naphthalene ring.

Examples of the use of these various N-protecting groups can be found in the earlier patent literature on aminopenicillins.

If a penicillin of Formula I is desired in which Y is a free amino group and the other is a benzyloxycarbonyl-amino group then it will be necessary to employ an enamine or o-hydroxyarylidenamino group for the appropriare protecting group so that the protecting group can be removed by hydrolysis leaving the benzyloxycarbonyl-amino group intact.

Thus in many senses the final step of removing the N-protecting group can be regarded as optical or only appropriate in certain cases. Therefore, the overall process may be set out as the acylation of an α-aminopenicillin of Formula II with a propionic acid derivative acylating agent of Formula VIII

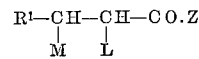 (VIII)

wherein R¹ and Z are as defined above and L is a hydrogen atom or a group —NHCOOR² where R² is an alkyl, aryl or aralkyl group or a Formula VII and M is a hydrogen atom, a group NHCOOR² wherein R² is as defined above, an acylamino group —NHCOR³ wherein R³ is a hydrogen atom, an alkyl, aryl or aralkyl group, or a substituted benzyloxycarbonylamino, azido, enamine of Formula VI or o-hydroxyarylidenamino group of Formula VII, to prepare an intermediate penicillin of Formula IX wherein each of the groups R, R¹, M and L are as defined above, and if the penicillin of Formula IX is not itself a penicillin of Formula I or if a penicillin of Formual I in which X or Y is an amino group is desired, the additional step of converting the M or L group which is benzyloxycarbonylamino, substituted benzyloxycarbonylamino, azido, enamine of Formula VI, or o-hydroxyarylidenamino of Formula VII to a free amino group.

The penicillins of Formula I may be presented for biological use in the form of their free acid or as a non-toxic salt and this may be presented alone or in association with a suitable pharmaceutical carrier, which term is to be interpreted in the widest sense to include such carriers as foodstuffs as well as diluents, binders, bulking agents and other conventional vehicles and additives and capsules and other container-carriers.

The invention will now be illustrated by the following examples, which are purely illustrative and are not meant to be exhaustive or limiting in any respect.

EXAMPLE 1

The preparation of sodium 6-[D-α-(L-β-benzyloxycarbonylamino - β - phenylpropionamido)-α-phenylacetamido]penicillanate L-β-benzyloxycarbonylamino-β - phenylpropionic acid $[\alpha]_D^{20}+24.7°$ (c. 1 in ethanol); 12.0 g. was dissolved in dry tetrahydrofuran (120 ml.) containing triethylamine (5.61 ml.). The solution was stirred vigorously and maintained at —5° C., while ethyl chloroformate (3.82 ml.) was added to it in one portion. A white solid was rapidly deposited. The stirring at temperatures between —5° C. and —10° C. was continued for twenty-five minutes. The suspension was cooled to —15° C. and stirred vigorously, while to it was added a 0° C. solution of 6-[D-α-amino - α - phenylacetamido]penicillanic acid trihydrate (16.2 g.), dissolved in water (40 ml.) and tetrahydrofuran (40 ml.) by the addition of sufficient triethylamine to raise the pH to 9.5. The resultant clear solution was allowed to stand for 40 minutes without external cooling. It was then evaporated at reduced pressure and temperatures below 20° C. to a gelatinous residue. It was covered with isobutyl methyl ketone (100 ml.) and stirred vigorously. The pH of the system was maintained at pH 2 by the addition of 5 N hydrochloric acid while a sufficient quantity of n-butanol was added to dissolve most of the gelatinous material. A small amount of insoluble material was removed by filtration, the two phases were separated, and the organic phase was washed with water (two portions of 100 ml.) and saturated brine (two portions of 150 ml.) and then clarified by filtration through siliconized filter paper and added dropwise with stirring to 40% w./w. sodium 2-ethyl-hexanoate in isobutyl methyl ketone (16.6 g.) which had been diluted with dry diethyl ether (1.51 g.). The white solid which precipitated was filtered off, washed with dry diethyl ether, and dried in vacuo over phosphorus pentoxide, to give sodium 6-[D-α-(L-β-benzyloxycarbonylamino - β - phenylpropionamido)-α-phenylacetamido]penicillanate (23.3 g.). The hydroxylamine assay procedure indicated that the product was 100% pure.

EXAMPLE 2

The preparation of 6 - [D - α - (L-β-amino-β-phenylpropionamido)-α-phenylacetamido]penicillanic acid 5% w./w. palladium on calcium carbonate (60 g.) was suspended in water (20 ml.) and shaken in an atmosphere of hydrogen at room temperature and pressure for one hour. A solution of sodium 6-[D-α-(L-β-benzyloxycarbonylamino - β - phenylpropionamido)-α-phenylacetamido]penicillanate (10 g.) in water (250 ml.) was then added and the shaking in an atmosphere of hydrogen was continued for 45 minutes.

The resultant suspension was centrifuged to remove most of the catalyst, which was suspended in a further quantity of water (200 ml.) and then separated on the centrifuge. The combined supernatant liquors were filtered through paper to remove residual traces of catalyst. The filtrate was brought to pH 2 with 5 N hydrochloric acid and then extracted with isobutyl methyl ketone (100 ml.). The aqueous phase was brought back to pH 4.7 with 10 N sodium hydroxide and then concentrated to low volume under reduced pressure and at temperatures below 30° C. to give a gelatinous precipitate. The precipitate was filtered off, washed with water and dried in the oven at 40° C. to give a white solid (1.5 g.) containing 6 - [D - α-(L-β-amino-β-phenylpropionamido)-α-phenylacetamido]penicillanic acid.

The product gave a single zone of antibiotic activity after paper chromatography and the hydroxylamine assay procedure indicated that the product was 70% pure.

EXAMPLE 3

The preparation of sodium 6-[D-α-(D-β-benzyloxycarbonylamino - β - phenylpropionamido)-α-phenylacetamido]penicillanate This compound (22.5 g.) was prepared from D-β-benzyloxycarbonylamino-β-phenylpropionic acid $[\alpha]_D^{20}$ —24.8° (c. 1 in ethanol); 12.0 g. by the procedure described for the epimer in Example 1. The hydroxylamine assay procedure indicated that the product was 99% pure.

EXAMPLE 4

The preparation of 6 - [D - α-(D-β-amino-β-phenylpropionamido)-α-phenylacetamido]penicillanic acid This compound was prepared by hydrogenation of sodium 6 - [D - α-(D-β-benzyloxycarbonylamino-β-phenylpropionamido)-α-phenylacetamido]penicillanate (10 g.) by the procedure described for its epimer in Example 2 except that a larger amount of catalyst (80 g.) was required for the hydrogenation. A white crystalline product (1.2 g.) was obtained which gave a single zone of antibiotic activity after paper chromatography. The hydroxylamine assay procedure indicated that the product was 73% pure.

EXAMPLE 5

The preparation of 6-[D-α-(D-β - formamido - β - phenylpropionamido)-α-phenylacetamido]penicillanic acid D-β-foramido-β-phenylpropionic acid (0.79 g.) was dissolved in dry tetrahydrofuran (15 ml.) containing triethylamine (0.69 ml.). The solution was stirred vigorously and maintained at —15° C. while ethyl chloroformate (0.48 ml.) was added to it in one portion. The stirring at —15° C. was continued for twenty minutes. To the resultant suspension was added a 0° C. solution of 6-[D-α-amino-α-phenylacetamido]penicillanate acid trihydrate (2.02 g.) dissolved in water (5 ml.) and tetrahydrofuran (5 ml.) by the addition of sufficient triethylamine to raise the pH to 8.6. The resultant clear solution was allowed to stand for 35 minutes. It was then evaporated at reduced pressure and temperatures below 20° C. to a gelatinous residue. It was suspended in water (10 ml.) and the vigorously stirred suspension was covered with isobutyl methyl ketone (20 ml.), and brought to pH 2 with 5 N hydrochloric acid. The resultant precipitate was filtered off, washed with water (10 ml.) and with isobutyl methyl ketone (10 ml.), and then dried in vacuo over phosphorus pentoxide to obtain a white solid (1.3 g.) containing 6-[D-α-(β-formamido-β-phenylpropionamido) - α - phenylacetamido]penicillanic acid. This material gave a single zone of antibiotic activity after paper chromatography. The hydroxylamine assay procedure indicated that the product was 85% pure.

EXAMPLE 6

Preparation of sodium 6-[D-α-(L-α-benzyloxycarbonylamino - β - phenylpropionamido)-α-phenylacetamido] penicillanate L-α-benzyloxycarbonylamino - β - phenylpropionic acid (5.98 g.) was dissolved in dry acetone (40 ml.) containing triethylamine (2.81 ml.). The solution was cooled to —5° C. and ethyl chloroformate (1.91 ml.) was added and the mixture stirred at —5° C. for twenty minutes. A white precipitate came down. The mixture was then cooled to —15° C. and to it was added with stirring a 0° C. solution of 6-[D-α-amino-α-phenylacetamido]penicillanic acid trihydrate (8.06 g.) in water (40 ml.) and tetrahydrofuran (40 ml.) and sufficient 2 N sodium hydroxide solution to achieve a pH of 8. The resulting mixture set to a solid mass. Dry acetone (30 ml.) was added and the mobile mixture was stirred for 45 minutes without external cooling. Water (100 ml.) was added and the organic solvents removed under low pressure and temperature below 25° C. The viscous white residue was diluted with water (400 ml.) and covered with isobutyl methyl ketone (100 ml.) and brought to pH 2 with 5 N hydrochloric acid, washed with water (two portions of 100 ml.) and saturated brine (100 ml.), clarified by filtering through a siliconized filter paper, and added dropwise with stirring to 40% w./w. sodium 2-ethylhexoate in isobutyl methyl ketone (8.4 g.) which had been diluted with dry diethyl ether (1600 ml.). The white solid which precipitated was filtered off, washed with dry diethyl ether (500 ml.), and dried in vacuo over phosphorus pentoxide to give sodium 6-[D-α-(L-α-benzyloxycarbonylamino-β-phenylpropionamido) - α - phenylacetamido]penicillanate (9.5 g.).

The hydroxylamine assay procedure indicated that the product was 74% pure.

EXAMPLE 7

Preparation of sodium 6 - [L-α-(L-α-benzyloxycarbonylamino - β - phenylpropionamido)-α-phenylacetamido] penicillanate L-α-benzyloxycarbonylamino - β - phenylpropionic acid (5.98 g.) was dissolved in dry acetone (80 ml.) containing triethylamine (2.8 ml.). The solution was cooled to —5° C. and ethyl chloroformate (1.91 ml.) was added and the mixture stirred at —5° C. for 20 minutes. A white precipitate came down. The mixture was cooled to —15° C. and to it was added with stirring a 0° C. solution of 6-[L-α-amino-α-phenylacetamido]penicillanic acid (7.0 g.) in water (40 ml.) and tetrahydrofuran (40 ml.) and sufficient 2 N sodium hydroxide solution to obtain a pH of 8.5. The clear solution was stirred without external cooling for 40 minutes. The organic solvents were removed under reduced pressure and temperatures below 25° C. The remaining gummy material was diluted with water (250 ml.), covered with isobutyl methyl ketone (100 ml.), and vigorously stirred and brought to pH 2 with 5 N hydrochloric acid. The isobutyl methyl ketone phase was washed with water (two portions of 100 ml.) and saturated brine (100 ml.) and then clarified by filtration through a siliconized filter paper. The clear solution was then added dropwise with stirring to 40% w./w. sodium 2-ethylhexoate in isobutyl methyl ketone (8.4 g.) which had been diluted with dry diethyl ether (1800 ml.). The white solid which precipitated was filtered off, washed with dry diethyl ether (500 ml.), and then dried in vacuo over phosphorus pentoxide to give sodium 6-[L-α-(L-α-benzyloxycarbonylamino - β - phenylpropionamido) - α-phenylacetamido]penicillanate (10.3 g.).

The hydroxylamine assay procedure indicated that the product was 55% pure.

EXAMPLE 8

Preparation of 6-[D - α-(D-α-benzyloxycarbonylamino-β-phenylpropionamido) - α-phenylacetamido]penicillanic acid D-α-benzyloxycarbonylamino - β - phenylpropionic acid (5.98 g.) was dissolved in dry acetone (60 ml.) containing triethylamine (2.8 ml.). The solution was cooled to −5° C. and ethyl chloroformate (0.95 ml.) was added and the mixture stirred at −5° C. for twenty minutes. A white precipitate came down. The mixture was then cooled to −15° C. and to it was added with stirring an ice-cold solution prepared from 6 - D - [α - amino-α-phenylacetamido]penicillanic acid trihydrate (8.06 g.), water (20 ml.), tetrahydrofuran (20 ml.) and sufficient 2 N sodium hydroxide solution to achieve a pH of 8. The resulting clear solution was allowed to stand without external cooling for thirty minutes. The organic solvents were then removed at low pressure and temperatures below 20° C. and the gummy residue diluted with water (500 ml.) and brought into solution by the dropwise addition of triethylamine keeping the pH below 8. The solution was filtered and added dropwise to water which was maintained at pH 2 by the addition as required of 5 N hydrochloric acid solution. The white solid which precipitated out was filtered off, washed well with water, and dried in vacuo over phosphorus pentoxide (yield 8.8 g.).

8 g. of this material was dissolved in methanol (350 ml.) at 50° C. and then allowed to stand at 5° C. for 2 hours. The white crystals which formed were filtered off, washed with cold methanol, and dried in vacuo over phosphorus pentoxide, to obtain 6-[D-α-(D-α-benzyloxycarbonylamino - β - phenylpropionamido) - α - phenylacetamido]penicillanic acid (4.6 g.) M.P. 148–9° C. (decomp) [α]$_D^{20}$ 131.5° (c. 0.5 in methanol). (Found (percent): C, 61.6; H, 5:7; N, 8.7; S, 4.9.

requires (percent): C, 61.1; H, 5.6; N, 8.6; S, 4.9.)

EXAMPLE 9

Preparation of 6-[D-α-(β-phenylpropionamido)-α-phenylacetamido]penicillanic acid 6-[D-α-amino-α-phenylacetamido]penicillanic acid trihydrate (16 g.) was dissolved in water (50 ml.) by the dropwise addition with stirring of 2 N sodium hydroxide solution keeping the pH below 8.5. To this was added in one portion with vigorous stirring a solution of β-phenylpropionyl chloride (6 ml.) in isobutyl methyl ketone (40 ml.) and the mixture was vigorously stirred at room temperature for one hour. The two phases were separated and the organic phase washed with water (two portions of 50 ml.) and with saturated brine (two portions of 50 ml.). At this stage a white solid started to crystallise out of the solution. The solution was stood at 5° C. for two hours and then filtered. The white residue was washed with cold isobutyl methyl ketone (5 ml.) and dried in vacuo over phosphorus pentoxide to give 6 - [D-α-(β-phenylpropionamido) - α - phenylacetamido]penicillanic acid (8.8 g.).

The hydroxylamine assay procedure indicated that the product was 89% pure.

EXAMPLE 13

(a) Preparation of D-α-ethoxycarbonylamino-β-phenylpropionic acid

D-α-amino-β-phenylpropionic acid (4.96 g.) was dissolved in water (100 ml.) by the addition of 2 N sodium hydroxide solution (30 ml.) and the solution cooled to 5° C. Ethyl chloroformate (3.3 ml.) was added in one portion and the mixture stirred without external cooling for one hour, whilst being maintained at pH 8 by the addition of 2 N sodium hydroxide solution as required. The solution was washed with ether (two portions of 100 ml.) and then blown free of ether and added dropwise with stirring to 5 N hydrochloric acid (100 ml.). The white precipitate which formed was filtered off, washed with water, and dried in vacuo over phosphorus pentoxide. This solid was recrystallised from an ethylacetate/hexane mixture to give D - α - ethoxycarbonylamino - β-phenylpropionic acid as white needles (4.3 g.) M.P. 83–84° C. (Found (percent): C, 60.8; H, 6.4; N, 5.8; C$_{12}$H$_{15}$NO$_4$ requires (percent): C, 60.7; H, 6.4; N, 5.9.) [α]$_D^{20.5°}$ −11.8° (c. 2 in methanol)

(b) Preparation of 6-[D-α-(D-α-ethoxycarbonylamino-β-phenylpropionamido) - α-phenylacetamido]penicillanic acid D-α-ethoxycarbonylamino-β-phenylpropionic acid (2.37 g.) was dissolved in dry acetone (30 ml.) containing triethylamine (1.4 ml.). The solution was cooled to −5° C., ethyl chloroformate (0.95 ml.) was added, and the mixture stirred at −5° C. for twenty minutes. A white solid precipitated. The mixture was then cooled to −15° C. and to it was added an ice-cold solution prepared from 6-D-[α-amino-α-phenyl-acetamido]penicillanic acid trihydrate (4.03 g.), water (10 ml.), tetrahydrofuran (10 ml.) and sufficient 2 N sodium hydroxide solution to achieve a pH of 8. The resulting clear solution was allowed to stand for thirty minutes without external cooling. The organic solvents were then removed at low pressure and temperature below 20° C. and the gummy residue was diluted with water (50 ml.) and covered with isobutyl methyl ketone (50 ml.) and brought to pH 2 with 5 N hydrochloric acid. A white solid which precipitated out of solution was filtered off, washed with water (50 ml.), and dissolved in water (100 ml.) by the dropwise addition of triethylamine keeping the pH at 9. This solution was filtered and added dropwise with stirring to water (300 ml.) which was maintained at pH 2 by the addition as required of 5 N hydrochloric acid. The white solid which precipitated was filtered off, washed with water (500 ml.), and dried in vacuo over phosphorus pentoxide, to give 6-[D-α-(D-α-ethoxycarbonylamino-β-phenylpropionamido)-α-phenylacetamido]penicillanic acid (3.0 g.).

The hydroxylamine assay procedure indicated the product was 88% pure.

EXAMPLE 11

This example describes an alternative route to the penicillin previously described in Example 2.

(a) Sodium L-N-(1-methoxycarbonylpropen-2-yl)-β-amino-β-phenyl-propionate

L-β-amino-β-phenylpropionic acid (8.26 g.) was dissolved in 2 N sodium hydroxide solution (25 ml.) and the resulting clear colourless solution was evaporated to dryness under reduced pressure at temperatures below 30° C. The residue was then dried in vacuo over phosphorus pentoxide to obtain the sodium salt as a white solid (9.3 g.).

Pulverised sodium L-β-amino-β-phenylpropionate (10.5 g.) was refluxed with ethanol (250 ml.) and methyl acetoacetate (5.5 ml.) for 15 minutes and the resulting solution was filtered. After standing in a refrigerator overnight the crystalline product was collected at the pump using vacuum filtration, washed with a little ethanol, and dried in vacuo over phosphorus pentoxide to give sodium L - N - (1 - methoxycarbonylpropen - 2 - yl) - β - amino-β-phenylpropionate, colorless elongated rhombs (9.6 g.) decomp. 260–262° C. (Found (percent): C, 59.3; H, 5.9; N, 4.9; Na, 7.8. $C_{14}H_{16}$ $NaO_4$ requires (percent): C, 59.0; H, 5.7; N, 4.9; Na, 8.1.) Evaporation of the mother liquors to low volume gave a second crop (2.6 g.).

(b) The preparation of 6-[D-α-(L-β-amino-β-phenylpropionamido)-α-phenylacetamido]penicillanic acid Dry acetone (35 ml.) was cooled to −15° C. to −17° C. under anhydrous conditions and ethyl chloroformate (0.96 ml.) was added followed rapidly by N-methyl morpholine (one drop) and sodium L-N-(1-methoxy carbonylpropen-2-yl)-β-amino-β-phenylpropionate (2.85 g.). The temperature of the slurry was maintained at −15° C. to −17° C. for 25 minutes. Meanwhile 6-D-[α-amino-α-phenylacetamido]penicillanic acid trihydrate (4.03 g.) was dissolved in water (15 ml.) with sufficient triethylamine to just dissolve the penicillin at pH 8.3. The solution was cooled to 0 to 5° C., acetone (15 ml.) was added, and then the solution was rapidly cooled to 0° C. and immediately added to the stirred anhydride. The resultant clear solution was stirred for 20 minutes without external cooling, then concentrated in vacuo at temperatures below 25° C. to obtain a viscous colorless syrup (20 ml.).

The concentrate was diluted with distilled water (500 ml.) and covered with isobutyl methyl ketone (100 ml.). The vigorously stirred solution was adjusted to pH 1.5 with 5 N hydrochloric acid and maintained at this pH for 30 minutes. The organic phase was then separated, the aqueous phase was re-extracted with isobutyl methyl ketone (2× 100 ml.), and the solvent layers discarded. The aqueous phase was readjusted to pH 4.5 with 40% sodium hydroxide solution and then evaporated under reduced pressure at temperatures below 30° C. (Octyl alcohol was added in order to prevent excessive frothing.) When the volume of the concentrate was approximately 40 ml. the first crop of crystals were collected at the pump, washed with a little water and dried in air at 35° C. to give 6[D-α-(L - β - amino - β - phenylpropionamido)-α-phenylacetamido]penicillanic acid (1.34 g., 27%). (Found (percent): C, 56.2; H, 6.0; N, 9.9; S, 5.4. $C_{25}H_{28}N_4SO_5 2H_2O$ requires (percent): C, 56.4; H, 6.1; N, 10.5; S, 6.0.) The mother liquors and washings were evaporated at temperatures below 30° C. to a volume of approximately 20 ml., when a second crop (0.58 g., 13%) was obtained.

The product was chromatographically homogeneous and indistinguishable from 6-[D-α-(L-β-amino-β-phenyl-propionamido)-α-phenylacetamido]penicillanic acid prepared by the route described in Example 2.

EXAMPLE 12

Sodium 6-[α-(D-β-benzyloxycarbonylamino-β-phenyl-propionamido)-α-thien-2′-ylacetamido]penicillanate In this and the two following examples the 6-[α-amino-α - thien - 2′ - ylacetamido]penicillanic acid used was the epimer prepared from (−)α-amino-2-thienylacetic acid having $[\alpha]_D^{20}$ −74° (c. 1 in $H_2O$).

D - β-benzyloxycarbonylamino-β-phenylpropionic acid was dissolved in dry tetrahydrofuran (30 ml.) containing triethylamine (1.4 ml.). The solution was stirred vigorously and maintained at −15° C. whilst ethyl chloroformate (0.96 ml.) was added in one portion. A white solid was rapidly deposited. The stirring at −15° C. was continued for 20 minutes and then to the vigorously stirred solution was added a 0° C. solution prepared from 6-[α-amino - α - thienyl-2′-ylacetamido]penicillanic acid (3.55 g.), water (10 ml.), and tetrahydrofuran (10 ml.) by the addition of sufficient triethylamine to raise the pH to 9.1. The resultant solution was allowed to stand for 40 minutes without external cooling, then evaporated at reduced pressure and temperatures below 20° C. to a gelatinous residue which was then covered with isobutyl methyl ketone (30 ml.) and stirred vigorously. The pH was adjusted to pH 2 by the additional of 5 N hydrochloric acid and then the two phases were separated. The aqueous phase was extracted with a further portion of isobutyl methyl ketone (10 ml.) and the two isobutyl methyl ketone extracts were combined and washed with water (two portions of 20 ml.) and saturated brine (two portions of 40 ml.). The solution was then clarified by filtration through siliconized filter paper and added dropwise with stirring to 37% w./w. sodium 2-ethylhexanoate in isobutyl methyl ketone (4.5 g.), which had been diluted with dry ether (1 l.). The precipitate was filtered off, washed well with dry ether and dried in vacuo over phosphorus pentoxide, to give a white solid (3.8 g.) which contained sodium 6-[α-(D-β-benzyloxycarbonylamino - β - phenylpropionamido) - α-thien-2′-ylacetamido]penicillante.

EXAMPLE 13

6-[α-(L-β-amino-β-phenylpropionamido)-α-thien-2′-ylacetamido]penicillanic acid

This compound was prepared from 6-[α-amino-α-thien-2′ - ylacetamido]penicillanic acid (3.55 g.) by the procedure described in Example 11 for the preparation of 6-[D-α-(L-β-amino-β-phenylpropionamido) - α - phenyl-acetamido]penicillanic acid from 6-D-[α-amino-α-phenyl-acetamido]penicillanic acid. The product (1.56 g.) was a white crystalline solid which gave a hydroxylamine assay of 74% and a single zone of antibiotic activity when subjected to paper chromatography.

EXAMPLE 14

6-[α-(D-β-amino-β-phenylpropionamido)-α-thien-2′-ylacetamido]penicillanic acid

Sodium D-N-(1-methoxycarbonylpropen-2-yl)-β-amino-β-phenylpropionate M.P. 261–2° C. (9.5 g.) (Found (percent): C, 58.7; H, 5.7; N, 4.9; Na, 8.3. $C_{14}H_{16}NNaO_4$ requires (percent): C, 59.0; H, 5.7; N, 4.9; Na, 8.1) was prepared from sodium D-β-amino-β-phenylpropionate (8.4 g.) by the procedure described for the L-isomer in Example 14.

Dry tetrahydrofuran (35 ml.) was cooled to between −15° C. and −17° C. under anhydrous conditions and stirred vigorously; ethyl chloroformate (0.96 ml.) was added followed rapidly by N-methylmorpholine (one drop) and sodium D-N-(1-methoxycarbonylpropen-2-yl)-β-amino-β-phenylpropionate (2.85 g.). The temperature of the slurry was maintained at −15° C. to −17° C. for 25 minutes. Meanwhile 6-[α-amino-α-thien - 2′ - ylacetamido]penicillanic acid (3.55 g.) was suspended in a mixture of water (15 ml.) and tetrahydrofuran (15 ml.) and just sufficient triethylamine was added to achieve solution. This solution was cooled to 0° C. and then the anhydride solution was added to it over one minute with vigorous stirring. Stirring was continued for 25 minutes without external cooling and then the pale yellow solution was filtered to remove a small amount of solid and concentrated in vacuo at temperatures below 25° C. to obtain a syrup (ca. 40 ml.).

The syrup was covered with isobutyl methyl ketone and brought to pH 2 by the addition of concentrated hydrochloric acid with vigorous stirring and maintained at this pH for 45 minutes. The isobutyl methyl ketone phase was then separated and discarded. The remaining aqueous phase and some oily material which did not dissolve in either phase were washed with a further quantity of isobutyl methyl ketone (50 ml.) and then brought to pH 4.5 by the addition of triethylamine. The solution was maintained at this pH with vigorous stirring for 45 minutes. A slurry of crystals was decanted from some remaining oil and filtered. The solid was washed with a little cold water and dried over phosphorus pentoxide in vacuo to obtain 6-[D-β-amino-β-phenylpropionamido)-α-thein-2′-ylacetamido]penicillanic acid (0.2 g.). A further crop (0.16 g.) was obtained after standing the mother liquors in the refrigerator for one day. The hydroxylamine assay procedure indicated that the product was 97% pure.

We claim:
1. A penicillin of the Formula I

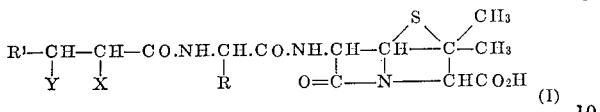

or a non-toxic salt thereof, wherein R and $R^1$ are the same or different and each is phenyl or thienyl, X is a hydrogen atom or a group —$NHCOOR^2$ where $R^2$ is lower alkyl, phenyl or benzyl, and Y is a hydrogen atom, an amino group, a group —$NHCOOR^2$ where $R^2$ is as defined above, or acylamino having 1 to 6 carbon atoms in the acyl part —$NHCOR^3$ wherein $R^3$ is a hydrogen atom, or lower alkyl, phenyl or benzyl.

2. A penicillin according to claim 1 wherein one of the groups X and Y is a hydrogen atom and the other is an amino group or a group —$NHCOOR^2$ as defined in claim 1.

3. 6 - [D - α - (L - β - amino - β - phenylpropionamido)-α-phenylacetamido]penicillanic acid.

4. 6 - [D - α - (D - α - benzyloxycarbonylamino - β-phenylpropionamido) - α - phenylacetamido]penicillanic acid.

5. 6 - [D - α - (D - α - ethoxycarbonylamino - β-phenylpropionamido) - α - phenylacetamido]penicillanic acid.

References Cited
UNITED STATES PATENTS 3,320,240   5/1967   Fosker et al. _____ 260—239.1
3,325,477   6/1967   Fosker et al. _____ 260—239.1

NICHOLAS S. RIZZO, Primary Examiner

U.S. Cl. X.R.

424—271